Oct. 18, 1932.  E. W. McINTIRE  1,883,807

ELECTRODE HOLDER

Filed March 9, 1931

INVENTOR.

Erastus W. McIntire

BY Lancaster, Allwine and Rommel

ATTORNEYS.

Patented Oct. 18, 1932

1,883,807

UNITED STATES PATENT OFFICE

ERASTUS W. McINTIRE, OF ONTARIO, CALIFORNIA

ELECTRODE HOLDER

Application filed March 9, 1931. Serial No. 521,301.

This invention relates to improvements in tools for holding welding rods and similar electrodes during electric arc welding operations and includes means for ejecting the unused portions of the electrodes and also includes means for transmitting electrical energy to the electrodes and for breaking the electric circuit.

In electric arc welding operations it is desirable to have an electrode holder which will grip the electrode firmly so that the same will not move about in the holder when being used and will not cause an arc to be drawn between the tool and the electrode, resulting in heating of the tool. Since an electrode butt will often adhere to the tool and frequently must be pried off, it is desirable to have some means, associated with the tool, which will dislodge and eject the electrode butt. In addition, to be able to easily break the current to the electrode is very important since injury to the eyes may result due to flashes when a tool not equipped with a current breaker accidentally comes into contact with the work or close enough thereto for an arc to be drawn.

The primary object of the invention is to provide an improved holder which will grip the electrode firmly, will remain cool under severe and protracted usage, and which will eject the butts or unused portions of the electrodes no matter at what angle they may be placed in the holder.

Another object is to provide a simple but sturdy switch mechanism for making and breaking the electric current to the electrode, and which will be controlled by the same hand which operates the holder.

Other objects and advantages of the invention will be apparent during the course of the following detailed description, taken in connection with the accompanying drawing forming a part of this specification and in which drawing.

Figure 1:
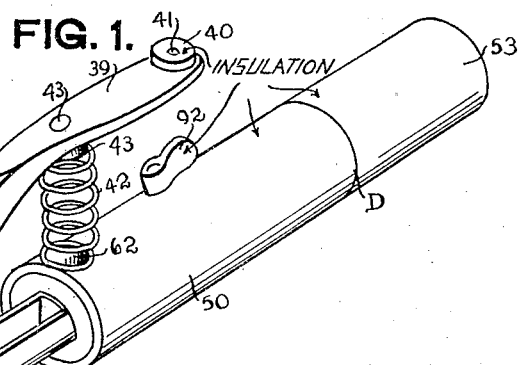
Figure 1 is a perspective view of the improved tool, with an electrode gripped by the jaws of the tool.

In the drawing and wherein similar reference characters designate corresponding parts thruout the several views, the letter A designates an electrode, B and C the jaw-carrying portions of the improved tool, D the casing, E means carried by the casing for transmitting electrical energy to the jaw carrying portions and F an insulated electrical conductor.

The electrode A, is similar to those in general use, as for instance, a welding rod or metallic pencil, acting as a negative electrode as used in the well known Slazianoff system of welding.

The jaw carrying portion B preferably includes an elongated channel-shaped arm 10 having a rounded base 11 and walls 12 forming a channel 13 and substantially flat upper faces 13', lying in the same plane and at the outermost portion of the arm. Upon each of these faces 13' is preferably soldered jaw members 15 of low electrical resistance metal, such as copper. The electrode receiving faces 14 of these jaw members may be scored or indented by a series of transverse and diagonal grooves or channels 16, 17 and 18 extending across the faces 14 and positioned so that the continuation of one groove from one face will follow the corresponding groove in the other face. Thus the electrode A may be positioned so that it will lie, for instance, within the groove 16 and bridge the space between the jaw members 15. Carried by the portion B are bearings 19 opposite each other. These bearings are provided with pivot pin receiving holes 20. Short of the end of the arm 10 opposite to the jaw members 15, the channel terminates and the arm 10 assumes preferably a circular shape and is outwardly threaded as at 21 and inwardly recessed as at 22. A screw threaded hole shown at 23, in the arm at its circular shaped portion, communicates with the recess adjacent its inward end, for a purpose later disclosed. In practice I prefer to construct this arm 10 of brass and solder thereto, as heretofore stated, the jaw members 15 of a low resistance metal such as copper in order to lessen heating of the parts due to an arc which might be drawn between a high resistance metal and the electrode, or otherwise.

Figure 2:
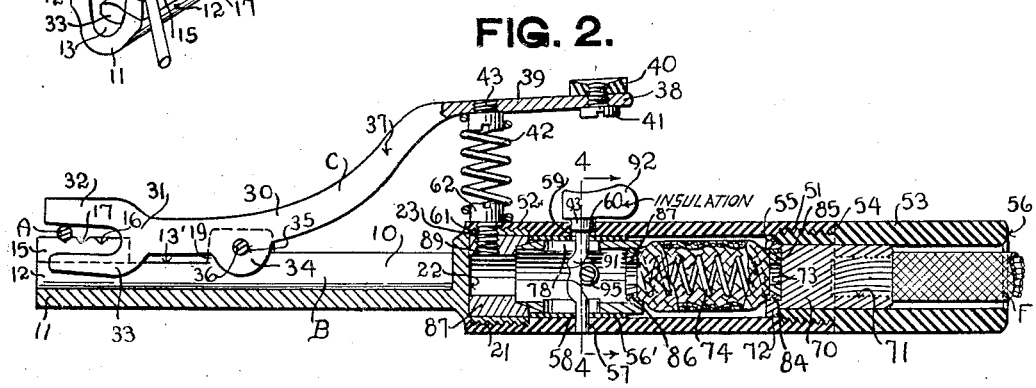
Figure 2 is a central longitudinal section thru the tool showing the switch on and an electrode gripped by the jaws of the tool.
Figure 3:
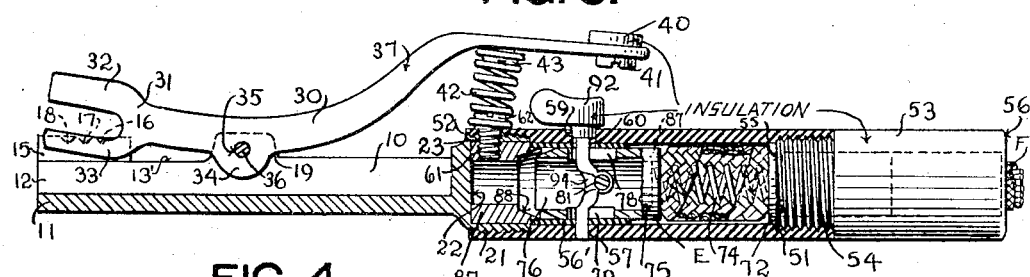
Figure 3 is a similar longitudinal section but showing the switch off and the electrode ejected.
Figure 4:
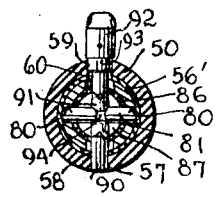
Figure 4 is a transverse section on the line 4—4 of Figure 2.

As to the jaw carrying portion C, it may include a bent lever rod or member 30 which terminates at one end in a jaw member 31 comprising a jaw 32 and a tongue or electrode ejector 33. The jaw is of a width slightly more than the distance between the two jaw members 15 of the jaw carrying portion B or, in other words, slightly wider than the width of the channel 13. The tongue 33, however, is of less width than the channel 13 and may be of less thickness than the jaw 32, as shown in Figures 1, 2 and 3 of the drawing. A boss 34 formed along the lower face of the lever rod 30 is provided with a pivot pin receiving hole 35 so that, by the use of a pivot pin 36 the jaw carrying portions B and C may be pivotally connected. From this boss 33 the lever rod extends upwardly and rearwardly as at 37 and 38 the rearward portion being flattened to form a table 39 upon which is mounted a button 40 of insulating material preferably attached to the lever 30 by a screw 41. A coil spring 42 abuts the lower face of the table 39 forwardly of the end carrying button 40 and is held in place by retainer 43 preferably comprising a cap screw. Normally, the tongue 33 lies within the channel 13 of the arm 10 with its end adjacent the end of the arm 10. The distance between confronting faces of the jaw 32 and the tongue 33 is such that the jaw may be elevated above the faces 14 of the jaw members 15 when pressure is applied to the lever at the table portion 39, in order that the jaws may grip electrodes of different diameters and so that the tongue will not interfere with the gripping of the larger diametered electrodes. However, further pressure upon the lever will cause the jaw 32 to become disengaged from the electrode and cause the tongue 33 to come into contact with the electrode and disengage and eject it.

The casing D preferably includes an elongated hollow cylindrical handle or body portion 50 interiorly screw threaded at both ends as at 51 and 52, a cap portion 53 also preferably hollow and cylindrical having an exteriorly screw threaded end 54 which threads into the interiorly screw threaded end 51 of the body portion 50. The interior circumference of the cap portion is less than the interior circumference of the body portion as shown in Figure 2 of the drawing so that the screw threaded end of the cap portion forms an abutment 55 when the cap is screwed into the body portion. The opposite end of the cap portion is rounded as at 56. Tightly fitting within the body portion near its forward end is a hollow cylindrical shell or guide 56. Crank shaft holes 57 and 58 pierce the body portion and shell, the holes registering while diametrically opposite are larger holes 59 and 60. A screw threaded hole 61 is provided adjacent the forward end of the body portion into which is threaded a cap screw 62 the head of which forms a retainer for an end of the spring 42 which abuts the body portion and normally urges the lever rod 30 away from the body portion 50. It is preferred that the body and cap portion be of insulating material. The jaw carrying portion B is attached to the casing D by means of the exteriorly screw threaded end 21 of the portion B and the interiorly screw threaded end of the casing D. When the screw threaded hole 23 registers with the screw threaded hole 61 the screw 62 is threaded therethru thus serving to hold the two portions against rotation.

Figure 5:
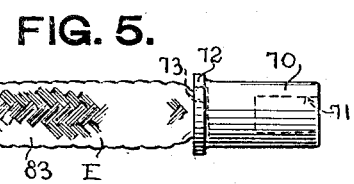
Figure 5 is a top plan view of part of the means associated with the tool for transmitting electrical energy.

The means E for transmitting electrical energy to the jaw carrying portions includes a preferably cylindrical, electrical-conductor-receiving base 70 having a conductor-receiving recess 71 in one end. The opposite end of the base is flanged as at 72 and provided with a preferably shallow recess 73. Separated from this base 70 by a coil spring 74 is a preferably hollow cylindrical plunger or electrical contactor 75, having a recess or opening 76 therein, one end of the plunger being beveled as at 77. An elongated slot 78 in the plunger communicates with the recess 76 while diametrically opposite thereto is a similar slot 79. Bearing-receiving holes 80 pierce the walls of the plunger and carry a bearing 81 which bridges the recess 76 and lies at right angles to the slots 78 and 79. As shown in Figure 5 of the drawing, looking down upon the plunger, the slots and bearing may be said to form a letter T. A flexible electrical-energy-conducting jacket 83 preferably of braided copper wires surrounds the spring 74 one end 84 of the jacket being secured to the wall of the shallow recess 73 by welding or otherwise securing, a ring 85 in the recess assisting in spreading the end 84 of the jacket and also forming a seat for one end of the spring 74. The opposite end 86 of the jacket 83 is welded or otherwise secured to the walls of the plunger recess 76 adjacent its end. A ring 87 somewhat similar to the ring 85 in the recess 76 assists in spreading the end 86 of the jacket 83 and also forms a seat for the other end of the coil spring 74. It will be seen that there is, therefore, a good electrical connection at all times between the base 70 and the electrical contactor or plunger 75 thru the copper jacket 83. A ring-shaped electrical contact or plunger seat 87 abuts the end and walls of the recess 22 of the arm 10. This electrical contact 87 has an inwardly beveled portion 88 which is adapted for seating or engagement of the plunger 75. A screw threaded continuation 89 of the screw threaded holes 61 and 23 permits the screw 62 to be threaded into the continuation 89 and thus locks the body 50 and the jaw carrying portion B to the contact 87. A crank shaft 90 having a crank 91 approximately midway its ends and a handle 92 of insulating material, at one end, having a cylindrical base 93 is provided. The handle 92 extends without the body portion 50, the base 93 fitting into the hole 59 in the body portion while the shaft extends thru the slot 78 of the electrical contactor 75 and into the recess 76 where the crank 91 which has a circumferential groove 94 comes into contact with the bearing 81 which is also provided with a circumferential groove 95, the crank and bearing abutting at the groove portion. Both grooves have a varying width as shown in Figures 2, 3 and 5 of the drawing to provide a good abutting surface at all times between the two while the crank shaft is being turned. The crank shaft extends thru the slot 79 of the contactor 75 and then thru the hole 58 in the shell 56 and seats in the hole 57 of the body portion 50. When the crank shaft is in the position as shown in Figure 2 of the drawing the spring 74 urges the contactor 75 into electrical engagement with the contact 87 but when the crank shaft is in the position shown in Figure 3 as after a 180° rotation of the handle 92, the electrical contactor is forced out of engagement with the contact and the circuit is broken, the contactor sliding within the hollow body 50 and guided by the shell or guide 56 a distance sufficient to break any arc which might tend to be drawn. The material forming the jacket 83 and the disposition of the material allows for elongation and contraction of the jacket, which is necessary in making and breaking the circuit. The portions 75 and 83 with the spring 74 may be easily removed from the casing by unscrewing the cap portion 53 and then removing the crank shaft 90 which may be disengaged by simply drawing it out of the slots 78 and 79 and the holes 57, 58, 59 and 60, pressure upon the crank 91 being removed when the flange 72 of the base 70 no longer bears against the abutment 55 of the cap portion 53, and the spring has been allowed to fully expand.

The insulated electrical conductor F may be of any approved type and the conductor thereof may be soldered to the base 70 as shown in Figure 2.

From the above it will be seen that an improved electric arc welding tool has been disclosed, embodying a jaw construction whereby the electrode will be held firmly until ready to be ejected, there will be no tendency to heat up the tool, and the electrode may be quickly ejected, no matter what angle is occupied with respect to the holder, upon pressure on the lever. The fingers of the same hand which holds the tool may also control the lever and switch mechanism. The several parts of the tool are so interconnected that easy assembly or replacement of parts is possible, while an efficient and sturdy tool results.

Changes in detail may be made to the form of invention herein shown and described, without departing from the spirit of the invention and the scope of the claims.

I claim:

1. In an electrode holder and ejector, the combination of an arm, a jaw member rigid therewith and a second jaw member pivotally carried by the arm and movable toward and from the first member, and an ejector carried by the movable member dislodging and ejecting an electrode carried by said holder.

2. In an electrode holder and ejector, the combination of an arm, two jaw members one rigidly carried by the arm and one movably carried by the arm, movable toward and from the rigid member, and an ejector carried by the movable member and movable with movements of the movable member, dislodging and ejecting an electrode carried by said holder.

3. In an electrode holder and ejector, the combination of an arm, two jaw members one rigidly carried by the arm and provided with an electrode receiving face, and one movably carried by the arm, movable toward and from the rigid member, and a tongue movable toward and from the horizontal plane of the face of said rigid jaw member, and carried by said movable member, dislodging and ejecting an electrode carried by said holder.

4. In an electrode holder and ejector, the combination of an arm, a jaw member having an electrode receiving face of low electrical resistance metal rigidly carried by said arm, a second jaw member pivotally carried by said arm, movable toward and from said first mentioned jaw member, and an ejector rigidly carried by said second jaw member dislodging and ejecting an electrode carried by said holder.

5. In an electrode holder and ejector, the combination of an arm, a jaw member rigidly carried by said arm, having an electrode receiving face of low electrical resistance metal, said face being scored by a series of transverse and diagonal grooves, a second jaw member pivotally carried by said arm, movable toward and from said first mentioned member and carried by said second mentioned member movable therewith past the plane of the base of said grooves, a tongue dislodging and ejecting an electrode carried in said grooves.

6. In an electrode holder and ejector, the combination of an arm, a jaw member rigidly carried by said arm, having an electrode receiving face, said face being scored by a series of transverse diagonal grooves, and a second jaw member pivotally carried by said arm movable toward and from said first mentioned jaw member, and an ejector carried by said second jaw member movable therewith past the plane of the bottom of said grooves, dislodging and ejecting an electrode carried in said grooves.

7. In an electrode holder and ejector, the combination of an arm, a jaw member rigidly carried by the arm, having two electrode receiving faces, said faces being scored by a series of electrode receiving grooves, a second jaw member pivotally carried by the arm, movable toward and from said first mentioned jaw member, and a tongue fixedly carried by the second jaw member and movable therewith past the horizontal plane of said face, dislodging and ejecting an electrode carried by said holder.

8. In an electrode holder and ejector, the combination of an arm, two jaw portions one movably connected with said arm and the other rigidly connected, the latter being channel-shaped, an ejector rigidly carried by the movable jaw and normally projecting into the channel but movable with said movable jaw to project without said first mentioned jaw carrying portion, dislodging and ejecting an electrode carried by said holder.

9. In an electrode holder and ejector, the combination of two jaw carrying portions, movably connected, one of said portions being channel-shaped and the other portion provided with a jaw member, the jaw being normally positioned over the channel and said jaw member carrying an ejector normally projecting into the channel but movable to dislodge and eject an electrode carried by said holder.

10. In an electrode holder and ejector, the combination of two jaw carrying portions, pivotally connected, one of said portions being channel-shaped and provided with a jaw member, the other jaw carrying portion movable toward and from said first mentioned jaw member and provided with a jaw and an ejector, said latter normally lying within the channel but movable in an arc to dislodge and eject an electrode carried by said holder.

11. In an electrode holder the combination of means for holding an electrode; a casing; and means carried by the casing for transmitting electric energy to said first mentioned means including an electrical contact in conducting communication with said first mentioned means, an electrical contactor, an electrical-conductor-receiving base member, a member between said base and contactor normally tending to urge the latter into engagement with said contact, a flexible electric energy conducting jacket connecting said contactor to said base and surrounding said member, and a switch member for manually forcing said contactor out of engagement with said contact.

12. In an electrode holder, the combination of means for holding an electrode; a casing of insulating material; and means carried by said casing for transmitting electric energy to said first mentioned means including an electrical contact connected to said first mentioned means, an electrical contactor, an electrical-conductor-receiving base member, a flexible electrical conducting jacket connecting said contactor to said base member, and a switch member for manually forcing said contactor out of engagement with said contact.

13. In an electrode holder, the combination of means for holding an electrode; a casing of insulating material including a hollow body portion and cap portion threaded in said body portion; and means carried by said casing for transmitting electric energy to said first mentioned means including an electrical contact connected to said first mentioned means, an electrical contactor, an electrical-conductor-receiving base member abutting said cap portion, a member forcing said contactor away from said base and into engagement with said contact when said cap is threaded into said body portion, a flexible electrical conducting jacket surrounding said last mentioned member and connecting said contactor with said base, and a switch member for manually forcing said contactor out of engagement with said contact.

14. In an electrode holder, the combination of means for holding an electrode; a casing of insulating material; and means carried by the casing for transmitting electric energy to said first mentioned means including an electrical contact connected to said first mentioned means, an electrical contactor having a slot in its surface communicating with a recess in the contactor and provided with a bearing in said recess, and a switch member for manually forcing said contactor out of engagement with said contact including a crank shaft extending thru said slot and having its crank portion disposed within said recess and in contact with said bearing.

15. In an electrode holder, the combination of means for holding an electrode; a casing of insulating material having a crank shaft receiving seat; and means carried by the casing for transmitting electric energy to said first mentioned means including an electrical contact connected with said first mentioned means, an electrical contactor having a recess and a slot communicating with said recess and with the surface of said contactor, and provided with a bearing in said recess, and a switch member for forcing said contactor out of engagement with said contact, including a crank shaft extending thru said slot and into said seat and having its crank portion disposed within said recess and in contact with said bearing.

16. In an electrode holder the combination of a hollow handle portion; means carried by the handle portion for holding an electrode; and means for transmitting electric energy into said first mentioned means including a plunger seat in contact with said first mentioned means; a plunger movable in said handle portion and adapted to seat in said plunger seat, an electrical conductor receiving base member, a spring between said plunger and said base normally tending to urge said plunger to seat in said plunger seat, a braided copper wire jacket surrounding said spring and connected to said plunger and said base and adapted to elongate and contract with forward and backward movement of said plunger and a manually operated switch member for forcing said plunger out of contact with said seat.

ERASTUS W. McINTIRE.